Sept. 19, 1967  D. E. LIGON  3,341,944
BARBER VACUUM SYSTEM
Filed April 29, 1965  2 Sheets-Sheet 1
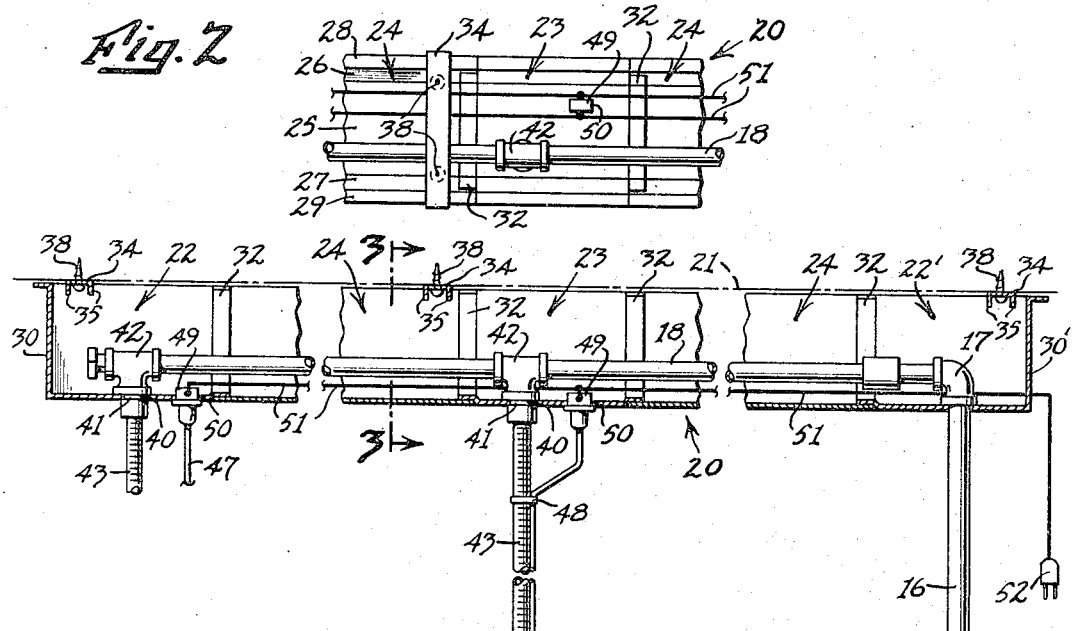
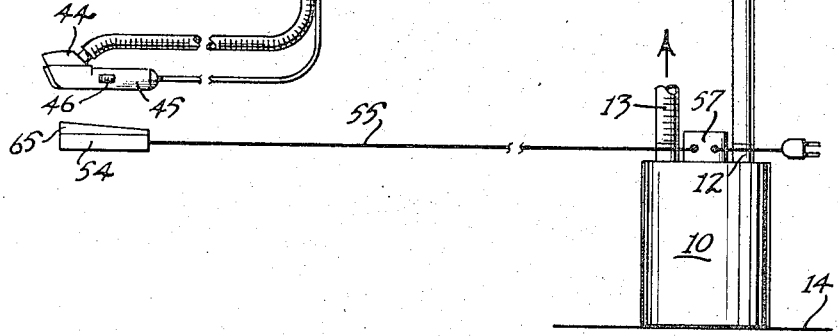
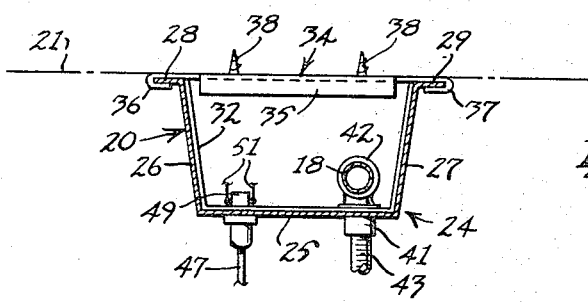
INVENTOR:
D. ELMON LIGON
BY
Harrington A. Lackey
ATTORNEY Sept. 19, 1967     D. E. LIGON     3,341,944
BARBER VACUUM SYSTEM
Filed April 29, 1965     2 Sheets-Sheet 2

INVENTOR:
D. ELMON LIGON
BY
Harrington A. Lackey
ATTORNEY

United States Patent Office 3,341,944
Patented Sept. 19, 1967

3,341,944
BARBER VACUUM SYSTEM
D. Elmon Ligon, Springfield, Tenn., assignor to Nasco, Inc., Springfield, Tenn., a corporation of Tennessee
Filed Apr. 29, 1965, Ser. No. 451,757
3 Claims. (Cl. 30—133)

This invention relates to a vacuum system for a barber shop, and more particularly to a manifold vacuum system in a barber shop for operating suction heads attached to the barber shears.

The prior art discloses several examples of barber shears upon which a suction head is attached to remove the hair clipped from a customer's head by the shears. One example of such shears is shown in the Gaskins Patent No. 2,946,122.

It is, therefore, an object of this invention to provide a vacuum system including a plurality of barber shears and attached suction heads for a multiple chair barber shop, to facilitate the operation of the shears and suction heads.

Another object of this invention is to provide a manifold system in which a single vacuum producing system is employed to operate all the suction heads for a plurality of shears.

A further object of this invention is to provide a barber vacuum system in which the manifold vacuum conduit and the common electrical circuit are attractively concealed and mounted so as not to interfere with the barber's operation of the suction heads and shears.

Another object of this invention is to provide a common housing for the vacuum manifold conduit for evacuating the suction heads and the electrical common line for energizing the shears.

Another object of this invention is to provide a barber vacuum system for a plurality of suction heads and barber shears including means for automatically actuating the suction heads.

Further objects and advantages of the invention will be apparent from the following description taken in conjunction with the drawings, wherein:

FIG. 1 is a fragmentary side elevation of one form of the invention, with portions of the housing broken away;

FIG. 2 is a fragmentary top plan view of the conduit housing;

FIG. 3 is a section taken along the line 3—3 of FIG. 1;

Figure 5:
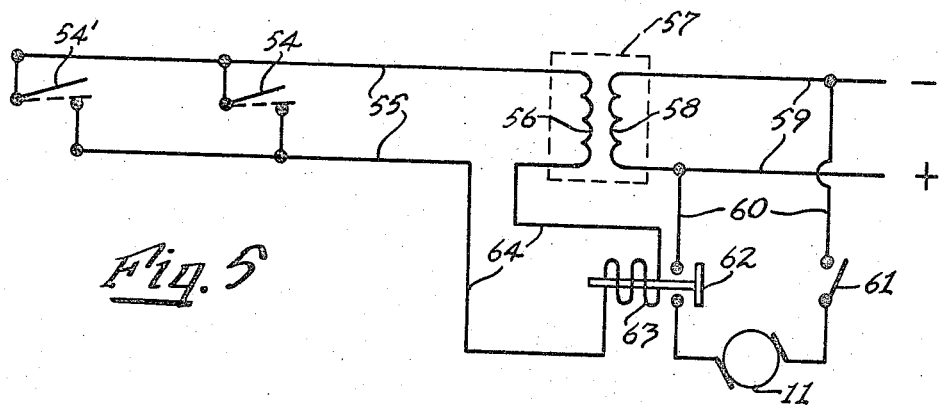
FIG. 5 is a schematic diagram of the electrical circuit for controlling the vacuum unit.
Figure 4:
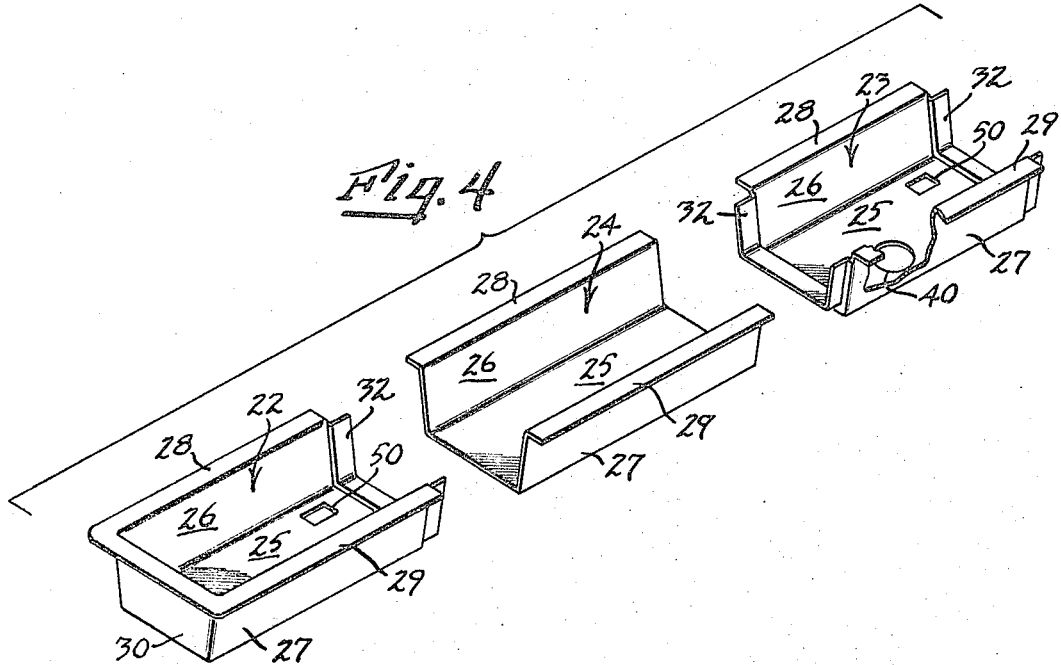
FIG. 4 is a perspective view showing the housing sections disassembled.

Referring now to the drawings in more detail, the vacuum unit 10 is of any conventional type, which includes an electrical motor 11 (FIG. 5) for creating a vacuum, and having an intake 12 and an outlet 13. In the particular embodiment disclosed in FIG. 1, the vacuum unit 10 is supported on the floor 14 of a barber shop, with its intake 12 connected or coupled to a riser conduit 16 extending upwardly and connected by an L coupling 17 to one end of a manifold vacuum conduit 18. The riser conduit 16 and the manifold conduit 18 are preferably of the same dimension and may be of any type of convenient material, such as plastic or metal tubing.

The manifold conduit 18 is mounted substantially horizontal to the floor 14 of the barber shop and is supported in a housing 20 shown suspended from the ceiling 21 of the barber shop. It will be understood that the housing 20 may be fixed to the side wall of the barber shop if desired. The housing 20 is preferably an elongated open-topped, channel-shaped member assembled from a plurality of sections, such as the end sections 22 and 22', the outlet sections 23 and the sleeve sections 24. All the sections 22, 23 and 24 have the same channel-shaped cross-sections, including a bottom wall 25 and upwardly diverging side walls 26 and 27, as best disclosed in FIG. 3. The upper portions of the side walls 26 and 27 extend outwardly substantially in the same plane to provide lips or flanges 28 and 29. Each end section 22 and 22' has one end closed by an end wall 30 and 30', respectively.

Both ends of each outlet section 23 and the open end of the end sections 22 and 22' are provided with thin projecting U-shaped tongue members for slip-fitting within the open ends of the sleeve members 24. In this manner, when all the end sections 22 and 22', outlet sections 23 and sleeve sections 24 are connected in the desired manner, the entire housing member 20 is provided with flush outer surfaces to present a unitary appearance.

The means for supporting the housing member 20 against a flat surface, such as the ceiling 21, are a plurality of longitudinally spaced hanger strips 34. Each hanger strip 34 is elongated and provided with down-turned side flanges 35 to provide rigidity, and bendable end portions 36 and 37 adapted to extend beyond the flanges 28 and 29. When housing sections 22–24 are placed flush against the hanger strips 34, the end portions 36 and 37 may be bent downwardly and inwardly around the flanges 28 and 29 to secure the housing member 20 to the hanger strips 34, as best disclosed in FIG. 3. Before the housing member 20 is secured to the hanger strips 34, the hanger strips are first secured to the flat ceiling 21 by means such as screws 38.

Barber chairs in a barber shop are customarily aligned in a straight row adjacent one side wall, upon which are mounted the wash basins and cabinets for supporting the necessary equipment accessible to the barber. The housing 20 is preferably mounted to extend substantially parallel to the row of chairs from the ceiling 21, or along the upper portion of the wall nearest to the chairs. The housing 20 is assembled so that an outlet section 23 is located in the vicinity of and preferably immediately above the particular barber chair to be serviced. The outlet section 23 is provided with an opening 40 in the bottom wall 25 in which is mounted a fitting 41 connected to a T-coupling 42 which connects adjacent sections of the manifold conduit 18. To the bottom portion of the fitting 41 is coupled a flexible hose 43, the other end of which is connected to suction head 44 attached to and adjacent the cutting head of the electrical shears 45. The shears 45 and suction head 44 may be of any conventional type, such as that disclosed in Patent 2,946,122. Electrical shears 45 are provided with a manually operated electrical switch 46 and are connected by an electrical branch line 47, preferably secured to the hose 43 by means such as clips or brackets 48.

The upper end of the electrical cord or line 47 is connected to an electrical fixture or receptacle 49 extending through another opening 50 in the bottom wall 25 of the outlet section 23. The electrical receptacle 49 is in turn connected in parallel with other receptacles in the bottom of the housing 20 to a common two-wire electrical circuit 51, which terminates in a plug 52 or other means for connecting the circuit to a source of electrical power. Thus, by merely manipulating the switch 46, the shears may be energized or de-energized.

In order to energize the vacuum system, a treadle switch 54 is located in the vicinity of each set of shears 45, preferably on the counter adjacent the barber's chair. The treadle switch 54 as best disclosed in FIG. 5 is located in the circuit 55 of the secondary coil 56 of a transformer 57. The primary coil 58 of the transformer 57 is supplied with electrical energy through the power circuit 59 from any convenient source. A motor circuit 60 is connected in parallel with the primary coil or power circuit 59, and includes in series a manually operated switch 61, the motor 11 and a relay switch 62. The coil 63 of the relay switch 62 is connected in series with the secondary coil circuit 55 by means of circuit 64. The treadle switch 54 is so constructed that when the shears 46 are resting upon the treadle 65, the switch 54 is open thus de-energizing the coil 63 to maintain the relay switch 62 open. However, when the switch 61 is closed in the motor circuit 60, and the shears 46 are removed from the treadle 65 by the barber, the switch 54 is automatically closed by spring means, not shown, to energize the secondary coil circuit 55 and relay coil 63, to close relay switch 62 and thereby start the motor 11 to actuate vacuum producing unit 10 and thereby create suction in suction head 44.

As shown in FIG. 5, additional treadle switches 54' may be connected in parallel with the treadle switch 54 in the secondary coil circuit 55 to provide each suction head 44 with an automatic actuating means, there being a treadle switch 54' for each additional suction head 44 and shears 45, depending upon the number of barber chairs.

Although it is apparent from the circuit diagram disclosed in FIG. 5 that only one pair of shears 45 may be lifted to start the vacuum unit 10 for the entire system, it will be understood that additional control valves may be included in each hose 43 or fixture 41 so that a vacuum will be created only in the suction head 44 attached to the shears 45 lifted from the treadle switch 54.

It will be observed that the treadle switch 54 and the shears switch 46 may be separately operated to selectively create vacuum in the suction head 44 independently of the actuation of the shears 45. Thus, it is possible for the barber to leave the shears switch 46 off, and lift the shears 45 merely to create vacuum in the suction head 44. Such an operation might be desired where the barber wishes only to clean the clipped hair, dirt or powder from his customer's head.

It will thus be observed that a system has been devised for servicing any number of barber shears, to which suction heads have been attached, in a convenient and unobstructed manner, and in which most of the elements are concealed from view. It will also be observed that the construction of the housing 20 and the manifold conduit 18, by their various sections and couplings, are readily adaptable for servicing barber shops of different sizes and having different numbers of barber chairs.

It will, therefore, be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A barber vacuum system comprising:
 (a) a vacuum-producing unit including an electrical motor for driving the unit, and having an intake,
 (b) barber shears remoted from said unit,
 (c) a suction head attached to said shears,
 (d) a flexible hose connecting said intake and said suction head in fluid communication,
 (e) a treadle switch for receiving said shears,
 (f) an electrical circuit connecting said treadle switch and said motor, whereby said switch opens said circuit when receiving said shears and closes said circuit when said shears are removed from said switch.

2. A vacuum system for a barber shop including a plurality of barber chairs comprising:
 (a) a vacuum-producing unit including an electrical motor and having an intake and an exhaust, said vacuum-producing unit being located remote from said barber chairs,
 (b) barber shears located in the vicinity of each barber chair,
 (c) a suction head attached to each barber shears,
 (d) a vacuum manifold conduit connected to said intake and sufficiently long to extend to the vicinity of each of said barber chairs,
 (e) means for supporting said manifold conduit,
 (f) a flexible hose connecting each suction head to said conduit,
 (g) a treadle switch in the vicinity of each barber chair for receiving each of said shears,
 (h) an electrical circuit connecting each of said treadle switches to said motor, whereby said switch opens said circuit when receiving said shears, and closes said circuit when said shears are removed from said switch to actuate said vacuum-producing unit,
 (i) an electrical common circuit extending to the vicinity of each of said barber chairs,
 (j) means for supplying electrical energy to said common circuit,
 (k) an electrical branch circuit extending from each set of shears to said common circuit, and
 (l) switch means on each shears for energizing said shears.

3. The invention according to claim 2 in which said treadle switches are connected in parallel with said electrical motor.

References Cited
UNITED STATES PATENTS

| 3,050,767 | 8/1962 | Rankin | 15—314 |
| 3,073,026 | 1/1963 | Schaedler | 30—133 |

WILLIAM FELDMAN, *Primary Examiner.*

G. WEIDENFELD, *Assistant Examiner.*